United States Patent
Bow et al.

(10) Patent No.: US 7,130,326 B2
(45) Date of Patent: Oct. 31, 2006

(54) GATED TIME DIVISION MULTIPLEXED SPREAD SPECTRUM CORRELATOR

(75) Inventors: Rouh T. Bow, Rolling Hills Estates, CA (US); Philip A. Dafesh, Los Angeles, CA (US)

(73) Assignee: The Aerospace Corporation, El Segundo, CA (US)

(*) Notice: Subject to any disclaimer, the term of this patent is extended or adjusted under 35 U.S.C. 154(b) by 766 days.

(21) Appl. No.: 10/098,792

(22) Filed: Mar. 13, 2002

(65) Prior Publication Data
US 2003/0174792 A1 Sep. 18, 2003

(51) Int. Cl.
H04B 1/69 (2006.01)
H04B 7/212 (2006.01)
H03D 1/02 (2006.01)

(52) U.S. Cl. ............ 375/130; 375/142; 375/147; 375/150; 375/343; 375/316; 370/294; 370/347; 370/345; 370/337

(58) Field of Classification Search .......... 375/208, 375/79; 342/357.12, 357
See application file for complete search history.

(56) References Cited

U.S. PATENT DOCUMENTS

| | | | | |
|---|---|---|---|---|
| 5,192,957 A | * | 3/1993 | Kennedy | 342/357.12 |
| 5,724,384 A | * | 3/1998 | Kim et al. | 375/149 |
| 6,208,291 B1 | * | 3/2001 | Krasner | 342/357.12 |

* cited by examiner

Primary Examiner—Kevin Kim
Assistant Examiner—Linda Wong
(74) Attorney, Agent, or Firm—Derrick Michael Reid

(57) ABSTRACT

A civil moderate (CM) code and a civil long (CL) code are time division multiplex (TDM) as a combined code having alternating code chips that spectrum spread a transmitted signal received by a receiver tracking the spectrum spreading code using a two-level correlator operating with +1 and −1 values to alternately correlate the received CM and CL code chips using a gating signal to gate by time the correlation of the two codes. The time gated two-level TDM correlation can be used in communication receivers, such as GPS receivers, receiving the TDM spectrum spreading codes.

20 Claims, 2 Drawing Sheets

CL AND CM CODE CORRELATOR

CL AND CM CODE CORRELATOR

CL AND CM CODE TRACKING SYSTEM

GATED TIME DIVISION MULTIPLEXED SPREAD SPECTRUM CORRELATOR

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of communication systems. More particularly, the present invention relates to spread spectrum receiver systems having quadrature correlators for correlating constituent spreading codes of a time division multiplexed composite spreading code.

BACKGROUND OF THE INVENTION

An essential part of the civilian GPS modernization effort has been to provide a second civilian signal on the L2 GPS carrier frequency, in addition to the course acquisition (C/A) signal currently on the L1 GPS carrier frequency. Initially, the modernization program planned to implement the GPS C/A signal on the GPS L2 carrier. Subsequently, alternate recommendations have been made to replace the C/A code on the L2 carrier with civilian codes having better correlation properties than the C/A code. Codes that have been considered for use on the L2 frequency include one of the L5 codes or the time division multiplexed (TDM) combination of two new codes with both codes chipped at the C/A chipping rate. The TDM codes include a civil-moderate (CM) ranging code and a civil-long (CL) ranging code that are significantly longer than the C/A code to improve the correlation and spectral properties as compared to C/A code. The new time division multiplexing (TDM) L2CS code has been specified to be implemented on the modified GPS satellites. The L2CS code improves the performance of both the high-volume single frequency and high-accuracy dual-frequency GPS receivers. The combination of the TDM CM and CL codes is used for code division multiple access (CDMA). The CM and CL spreading codes are multiplexed on a chip-by-chip basis. The CM code and CL code are combined as a composite spreading code that provides improved tracking performance superior to that of the C/A code.

The new L2 civilian signal L2CS is planned for use on the L2 GPS frequency to provide civilian users with improved ionospheric correction. The L2CS signal is a TDM combination of the moderate length CM code of 20.0 millisecond duration with data, and the long length CL code of 1.5 second duration without data. The composite code is much longer than the one millisecond C/A code for improved correlation properties resulting in superior cochannel interference rejection and less self noise. A dataless channel can provides 6.0 dB improvement in carrier tracking at low C/No, where C/No is the carrier power to noise spectral density ratio. In cell phones and personal data assistants, the L2CS signal is deemed essential for high-precision dual frequency GPS applications.

The TDM codes provide near continuous line spectra as compared to the C/A code, which concentrates power at one kilohertz spaced spectral lines. In order to obtain the ideal processing gain advantages of a spreading code, the code should exhibit near-continuous line spectra. When an interferer falls on one of the C/A code spectral lines, the ideal processing gain of C/A code is reduced. The effective C/No in the presence of an interferer having power I, is given by a C/No equation.

$$\left(\frac{C}{N_0}\right)_{eff} = \frac{C}{N_0 + I_0} = \frac{C}{N_0 + \left(\frac{I}{C}\right)\left(\frac{CT_i}{PG}\right)}$$

In the C/No equation, the term $T_i$ is the coherent integration period, and the term PG is the processing gain in an ideal spreading process of a continuous line spectrum and is given by the product of the code rate, such as the 1.023 MCPS C/A code rate. The integration period is limited to 20 ms for the C/A code with data. Using the C/A code, the integration is continuous over time with the accumulated correlations dumped at a C/A dumping rate. The C/A code effectively loses processing gain when an interference source coincides with a C/A code spectral line while the L2 CL code is unaffected. The effective C/No gain reduction observed for the C/A code corresponds to a loss of processing gain as indicated by the C/No equation.

The L2CS TDM code receiver implementation uses a three-level reference code having +1, 0, and −1 levels with expected benefits of independently tracking either of the L2 CM or CL codes. In a conventional CDMA correlator, the received signal is multiplied by a two-level local reference code having +1 and −1 levels. The results are accumulated by integration over an integration and dump period and used to despread the CDMA signal for use in code acquisition, code tracking, carrier tracking and data demodulation circuits. During signal acquisition, prior to code tracking, the code phase of the local reference signal is shifted and the magnitude of the inphase and quadrature correlators is monitored until the correct code phase is detected. In a receiver, code tracking compares a code phase shifted replica of the code to the code received and continually adjusts the code phase so that the replica and received codes become synchronized. The correlation of early and late reference codes provides an input to a control loop for adjusting the local code phase until synchronized despreading of the received signal is achieved. Correlator implementations used in most low-cost high volume commercial GPS receivers typically employ two-level reference codes that are multiplied by the incoming signal using a multiplier, such as 2-bit by 1-bit multiplier. Such a multiplier can be simply implemented by modulating the sign bit of the incoming 2-bit I and 2-bit Q samples according to one of the two possible values of the reference code. This conventional two-level correlation process is well known.

In the L2CS codes implementation, the CM and CL codes are TDM into a composite code of alternating code chips. Because the code chips are interleaved, a means is necessary to correlate with the desired code, such as the TDM CM or CL code. The conventional method is to correlate the received signal with a reference code. The conventional two-level correlator technique for tracking two-level spreading codes using the conventional two-level replica codes, having values of +1 or −1, is replaced by a three-level correlator technique using a three-level reference code having values of +1, 0, −1, where the 0 value is placed on every other chip and used to mask out one code while tracking the other code. The segmented interleaved composite code appears as M1, L1, M2, L2, M3, L3, M4, L4, and so on, generated from respective CM and CL codes, where M1 is the first chip of the CM code and M2 is the second chip of the CM code, and so on. Similarly, L1 is the first chip of the CL code, L2 is the second chip of the CL code, and so on. In the receiver, during acquisition of the CM code, the replica CM code is generated using three levels, where the +1 and −1 levels define the replica CM code while the zero level masks out the alternating CL code chips. The three-level CM code replica is used in a three-level CM correlator. The three-level replica CM code is generated as M1, 0, M2, 0, M3, 0, M4, 0, and so on. After acquisition and tracking of the CM code, the replica CL code is generated using three levels, where the +1 and −1 values define the replica CL code and the zero levels masks out alternating CM code chips. The three-level CL code replica is used in a three-level CL correlator. The three-level replica CL code is generated as 0, C1, 0, C2, 0 C3, 0, C4, and so on. In effect, the three-level correlation process is used to ignore, that is, used to mask, the untracked code by multiplying by the zero value every other chip. Unfortunately, this three-level correlator technique increases the complexity and the required number of operations per second per correlator, used to acquire and track the TDM codes, relative to the complexity of existing C/A code correlator implementations used in many commercial C/A code GPS receivers. The increase in complexity is due to representing the spreading code by more than one bit to employ the three-level correlator approach, thereby preventing the simple sign-bit implementation of the multiplier used in conventional correlation processes. This increased complexity is especially detrimental for parallel-correlator GPS signal acquisition implementations that perform many correlations in parallel. Also, during code and carrier tracking and data detection operations, staggered correlations are processed in parallel using early, prompt, and late correlation processes. All of these correlation processes need three-level correlation implementations for mass consumer applications of GPS using the L2CS spreading code. These correlation processes can be used for GPS signal processing, such as in cell phones for emergency 911 applications. Parallel correlator technology is used in such receivers to enable reasonable signal acquisition times at low signal levels encountered when a cell phone is used in a building. Such applications are especially sensitive to power consumption increases that would result from increased complexity of the correlation process. Parallel correlator techniques are even more necessary to efficiently acquire the TDM signals because the code periods are many times longer than that of the C/A code. Given that power consumption is directly related to computational complexity, the complex circuits consume more power. Hence, it is desirable to use two-level correlation processes in GPS receivers. Thus, a more conventional two-level correlator implementation is highly desirable for use in reception of the L2CS TDM codes and represents the smallest change to existing commercial GPS receiver designs.

The CM code and CL code are TDM on a chip-by-chip basis. These codes were designed to service the needs of future low-cost high-precision dual frequency GPS users. In particular, the CM code is 10230 chips long and is transmitted at a 0.5115 MCPS rate with a period of 20 ms. The data, spread by the CM code, is 25 bits per second and is coded by a convolutional coder having a symbol period of 20 ms. For the TDM signals, the symbol period is 20 ms with the data being transmitted at 25 BPS. The CL code, on the other hand, is 767250 chips long and is transmitted at a 0.5115 MCPS rate. The entire code has a period of 1.5 seconds and is designed for high precision tracking using a phase locked loop. Theoretically, this multiplexing approach should provide an even energy split that is equivalent to a 3.0 dB loss per code, relative to no multiplexing between the CM and CL codes with no other measurable degradation in performance for the constituent codes. Tracking of the individual constituent codes is achieved using the three-level reference code with zeros in alternating chips of the code.

While the chip rate of the CM and CL codes is 0.511 MCPS, the 1.023 MCPS chip rate of the TDM combination is the same as the C/A code. However, the CM and CL codes are essentially transmitted at a 50% duty cycle with the CL code and the CM code respectively, each on half of the time, making the code chips appear to be chipped at the same rate as C/A code. The zeros in the three-level reference codes are used to enable the correlation and tracking of the CM code while ignoring CL correlations when the CL code is present, and for correlation of the CL code while ignoring CM correlations, when the CM code is present. The code properties of the composite CM and CL TDM code has been shown to be superior to that of C/A code. While this multiplexing approach with three-level reference correlation offers a means to acquire and track the CM codes, the receiver implementation is less efficient than that of a conventional C/A code receiver. This leads to excessive power consumption and increased costs because the implementation of a correlator using the three-level reference requires changing the multiplication operation used in existing C/A code receivers from 1.5 bit by 1 bit to 1.5 bit by 1.5 bit, which increases the receiver gate count. As a result, the increased power consumption is unsuitable for cell phones and small personal digital assistants. The existing chip-interleaved composite code disadvantageously uses a more complex three-level correlator in GPS receivers than a two-level correlator used in existing GPS receivers. These and other disadvantages are solved or reduced using the invention.

SUMMARY OF THE INVENTION

An object of the invention is to provide a two-level correlator for correlating a composite code of time division multiplexed spreading codes.

Another object of the invention is to provide a two-level correlator using two-level reference codes and a gating signal.

Yet another object of the invention is to provide a two-level correlator using a gating signal to alternately gate code segments of a long spreading code and a short spreading code interleaved into a composite code.

Still another object of the invention is to provide a two-level correlator using a gating signal to alternately gate code chips of a CM spreading code and a CL spreading code with the chips interleaved into a composite L2CS code.

The present invention is directed to a gated time division multiplexed spread spectrum correlator. The correlator is a two-level correlator that is used to correlate one of a number of time division multiplexed composite spreading codes. The correlator is preferably used to correlate the new time division multiplexed (TDM) civilian signal L2CS that is planned to be implemented on the L2 GPS frequency. The L2CS signal comprises two TDM ranging codes, denoted as the civil moderate (CM) code and the civil long (CL) code. The two-level correlator retains the reduced complexity for commercial GPS receivers used to acquire and track the L2CS signal. The composite code is used in code division multiple access (CDMA) communication systems.

The correlator generates two-level CM and CL code replicas operating on the composite L2CS signal in an efficient implementation, used to despread the TDM spreading codes that can be generally used in spread spectrum communication systems. A gating signal is used to alternately gate a second code of the composite code while correlating and tracking a first code, and to alternately gate a first code of the composite code while correlating and tracking the second code. The use of a gating signal optimizes the power consumption of digital circuits. This correlation process uses a two-level reference code having +1 and −1 values. Furthermore, the two-level implementation of a correlator using a two-level reference code is compatible with existing two-level commercial C/A code receivers. This reduces the redesign costs of modifying existing receiver designs to receive the new TDM signal.

The TDM CDMA signal consists of two different pseudorandom sequences, that is, the CM and CL codes. During correlation, the received TDM CDMA signal is correlated by switching between the two pseudorandom sequences of the CM and CL codes every 977.5 ns chip of the TDM code. The receiver of the TDM CDMA signal uses a local TDM CDMA code generator subject to a periodic squarewave gating signal having a zero bit followed by a one bit that are repeated to gate the receiver integrate-and-dump clock for gating one code during correlation of another code of the composite code. The squarewave signal is synchronized with the switching of the two pseudorandom sequences in the TDM CDMA signal. For example, the squarewave gating signal is low when the pseudorandom sequence CM is being correlated, and the squarewave signal is high when the pseudorandom sequence CL is being correlated. When the squarewave is high, for example, CM code integration and accumulation occurs and CL code integration and accumulation does not. When the squarewave is low, for example, CL code integration and accumulation occurs and CM code integration and accumulation does not. The squarewave gating signal is used by integrators to start and stop the integration of the two pseudorandom sequences. The squarewave gating signal, and its inverted form, controls the integration accumulation process as a two-level squarewave gate. After accumulated integrations, the accumulated integrated values are fed to dumpers that dump the accumulated integrated values. The integrations continue to accumulate new integrations until reset at the time of dumping. The integrator is reset to zero as the accumulated integrations are dumped at the end of the accumulation period defining the dumping rate. The CM and CL dumping rates are different for the CM moderate length and CL long length codes, while the integration time is based on the chip period of both codes. The use of the squarewave gating signal provides a gate to the integrate functions. A dumping signal controls the holding of the data in storage in the dumpers at time of dumping. Each pair of integrators and dumpers accumulate integrations and dump accumulation correlations for use in a receiver tracking code phase of a direct sequence spreading code. The tracking of code phase conveniently provides gate signals, such as the dumping signal at the dumping rate, and the gating signal signals at the chip rate.

The gated correlation process is a computationally efficient approach for the reception of the new TDM L2CS GPS signals.

The gated TDM spread spectrum correlator has applications to the reception of L2CS Signal and other TDM spreading codes. In general, the gated TDM spread spectrum correlator may be applied to any number of time division multiplexed spreading codes. The correlator requires changes in the gated timing of the integrate and dump functions applied to two-level replica codes. The correlation process uses modified gating that can be generally applied to spread spectrum systems employing chip-by-chip time multiplexing of a composite code. These and other advantages will become more apparent from the following detailed description of the preferred embodiment.

DETAILED DESCRIPTION OF THE PREFERRED EMBODIMENT

Figure 1:
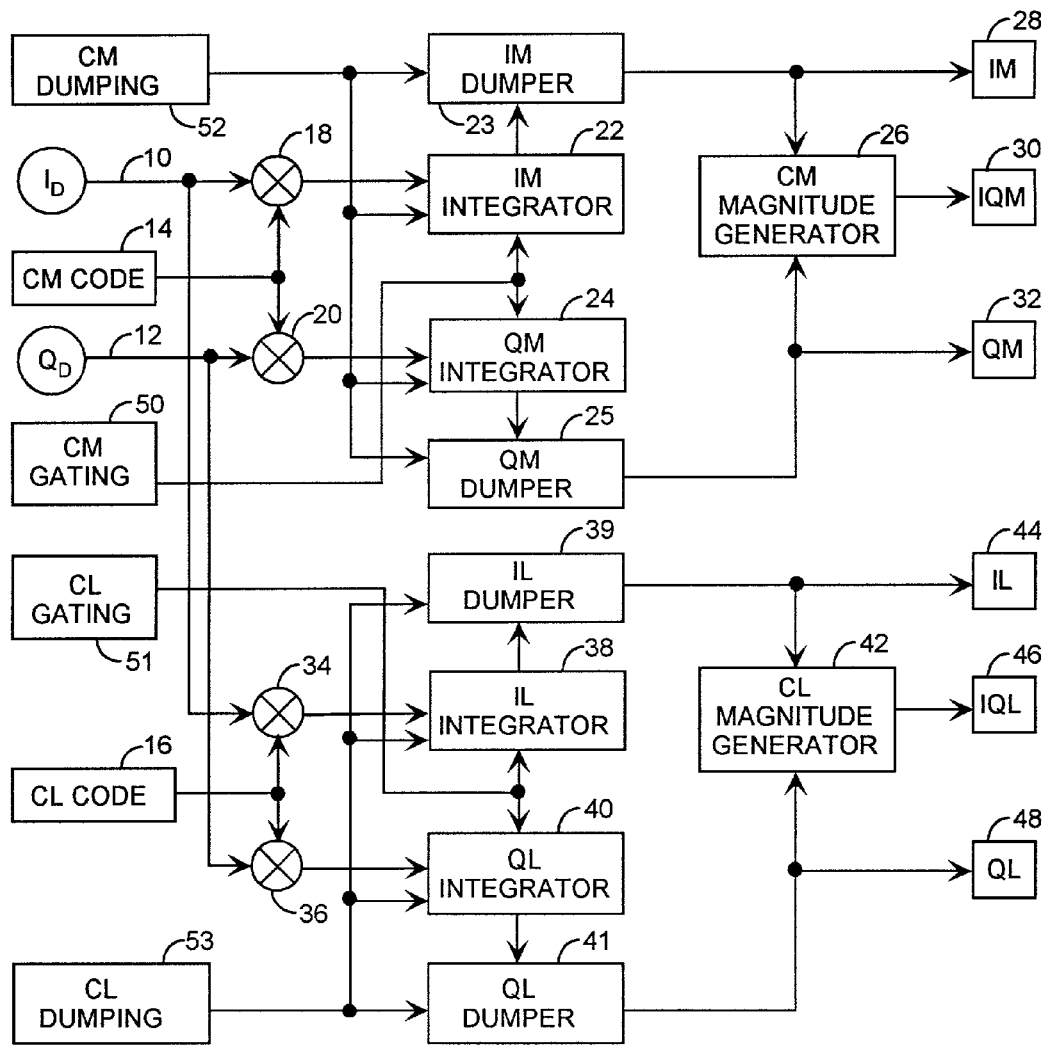
FIG. 1 is a block diagram of a CM and CL correlator.

An embodiment of the invention is described with reference to the figures using reference designations as shown in the figures. Referring to FIG. 1, a CL and CM correlator receives a demodulated inphase signal $I_D$ 10 and a demodulated quadrature signal $Q_D$ 12, that are carrier demodulated. The $I_D$ and $Q_D$ signals are spectrum spread using a composite spreading code prior to transmission. The composite spreading code can generally be any spreading code that can be time division multiplexed, that is, code segmented in time into at least two constituent codes for code segment correlation in a two-level correlator in a receiver. In the preferred form, the composite spread code comprises a code segmented civil moderate (CM) length code and a code segmented civil long (CL) code, both of which are preferably code segmented on a chip-by-chip basis, and time division multiplexed (TDM) during spectrum spreading prior to transmission. As such, constituent code replicas are generated in a receiver and used during correlation on a time division multiplexed basis. In the preferred form, the constituent codes are a CM code 14 and CL code 16.

The CM code and CL code are used to spectrum despread the $I_D$ and $Q_D$ signals 10 and 12. The CM code is TDM correlated with the received $I_D$ and $Q_D$ signals 10 and 12, respectively, using an IM mixer 18 and a QM mixer 20 providing spectrum despread inphase and quadrature correlated CM signals, respectively, to an IM integrator 22 and a QM integrator 24, that respectively integrate the inphase and quadrature correlated CM signals over CM chip integration periods at a CM accumulated integration rate that is a CM dumping rate, providing IM and QM accumulated integrations, respectively. The IM and QM accumulated integrations are respectively fed to an IM dumper 23 and a QM dumper 25 respectively providing IM accumulated correlations 28 and QM accumulated correlations 32 at the CM dumping rate. The CM accumulated integration period is the inverse of the CM dumping rate. The IM and QM accumulated correlations 28 and 32 are dumped into a CM magnitude generator 26 for generating an IQM magnitude signal 30.

The CL code is TDM correlated with the received $I_D$ and $Q_D$ signals 10 and 12, respectively, using the IL mixer 34 and QL mixer 36, providing spectrum despread inphase and quadrature correlated CL signals respectively, to an IL integrator 38 and a QL integrator 40 respectively, integrated over CL chip integration periods and accumulated over a CL accumulated integration periods at a CL dumping rate providing IL accumulated integrations and QL accumulated integrations. The IL and QL accumulated integrations are respectively fed to an IL dumper 39 and a QL dumper 41 for respectively dumping the IL accumulated correlations 44 and QL accumulated correlations 48 at the CL dumping rate.

The CL accumulated integration period is the inverse of the CL dumping rate. The IL and QL accumulated correlations are dumped at the CL dumping rate into a CL magnitude generator 42 for generating an IQL magnitude signal 46. The outputs of the integrators 22, 24, 38, and 40 are accumulated integrations of the multiplication of the incoming spectrum despread correlated signals with high and low levels of the chips of the TDM codes. The CM and CL accumulated integrations are dumped at respective CM and CL dumping rates.

Integration and dump timing are controlled by a CM gating signal 50, a CL gating signal 51, a CM dumping signal 52, and a CL dumping signal 53. The CM gating signal 50 enables integration by the IM and QM integrators 22 and 24 at the CM integration rate. The CL gating signal 51 activates the integration by the IL and QL integrators 38 and 40 at the CL integration rate. The CM dumping signal 52 activates the dumping of IM dumper 23 and the QM dumper 25 at the CM dumping rate. The CL dumping signal 53 activates the dumping of IL dumper 39 and the QL dumper 41 at the CM dumping rate. The CM dumping signal 52 is communicated to the IM and QM integrators 22 and 24 to reset the integrators 22 and 24 at the end of each dumping period. Likewise, the CL dumping signal 53 is communicated to the IL and QL integrators 38 and 40 to reset the integrators 38 and 40 at the end of each dumping period. At the beginning of each dumping period, the value of the accumulated integrations by each of the integrators 22, 24, 38, and 40 is set to zero.

In the preferred form, the CM code and CL code are TDM on every other chip, both having the same chip period. Hence, in the preferred form, the CM gating signal 50 is an inverted version of the CL gating signal 51, both being a squarewave having a one half duty cycle chip integration period. It should be apparent that the CL gating signal and CM gating signal are inverted versions of a single gating signal. The CM gating signal can be generated from the CL gating signal using an inverter, not shown, to provide an inverted gating signal as well as the original noninverted gating signal. Alternatively, the CL gating signal may be generated by inverting the CM gating signal using the inverter.

In the preferred form, two different length codes, the CM code and the CL code, are TDM for spectrum spreading the transmitted signal. The CM code is a moderate length code having a CM dumping rate that is preferably less than the CL dumping rate of the CL code. The accumulating integrations are accumulated over the plurality of chips periods defining the dumping rates. The CM accumulated integrations are integrated over 10230 CM code chips. During a first half of the gating signal squarewave, equal to one chip period, the signal is integrated and accumulated, and not integrated and accumulated over the second half of the gating squarewave, that is also equal to one chip period. Hence, the accumulated integrations occur over 20460 CM and CL chips for a total accumulated integration duration of 20 ms when the chip period is one microsecond. The accumulated integration duration defines the CM dumping rate between each dump of the CM accumulated correlations. The CM code is processed in the same manner but at a different dumping rate over a different number of chips periods.

While the timing is controlled on chip-by-chip TMD multiplexing basis of the CM and CL codes, a plurality of different codes using the same or different accumulation periods could be used as well, only the chipping rate being equal among the plurality of different codes. After dumping, the accumulated integrations are reset to zero. The gated integration is achieved by clocking each of the CM and CL codes at alternate samples of a system clock. For the case of a 2.046 MHz clock, two samples of the spectrum spread correlated signal are taken per TDM code chip. With the chips of the TDM codes having the same period, the CM and CL codes are sampled on an alternating chip-by-chip basis.

Due to the inversion between the CM and CL gating signals, in the preferred form, the IM and QM integrators 22 and 24 integrate the spectrum despread inphase and quadrature correlations from the IM and QM mixers 18 and 20 when the CM gating signal is high and the inverted gating signal, that is the CL gating signal, is low during the first half duty cycle, and then, the IL and QL integrators 38 and 40 integrate the spectrum despread inphase and quadrature correlations from the IL and QL mixers 34 and 36 when the CL gating signal is high and the inverted gating signal, that is the CM gating signal is low, during the second half duty cycle. As such, the integrations are TDM between the CM and CL codes 14 and 16, on a chip-by-chip basis. The CM and CL gating signals 50 and 51, as well as the CM and CL code are two-level signals, and hence, the CL and CM code correlator is a gated two-level TDM correlator for correlating spread spectrum signals $I_D$ 10 and $Q_D$ 12. Significantly, the CM and CL code correlator uses two-level squarewave gating signals for use with biphase replica CM and CL codes. As such, the correlator can be used without significant changes to C/A code digital tracking loops. Further, the gating signals 50 and 51 can be used to power down the integrators 22, 24, 38, and 40 when not integrating over respective phases of the squarewave gating signals 50 and 51 to conserve power.

Figure 2:
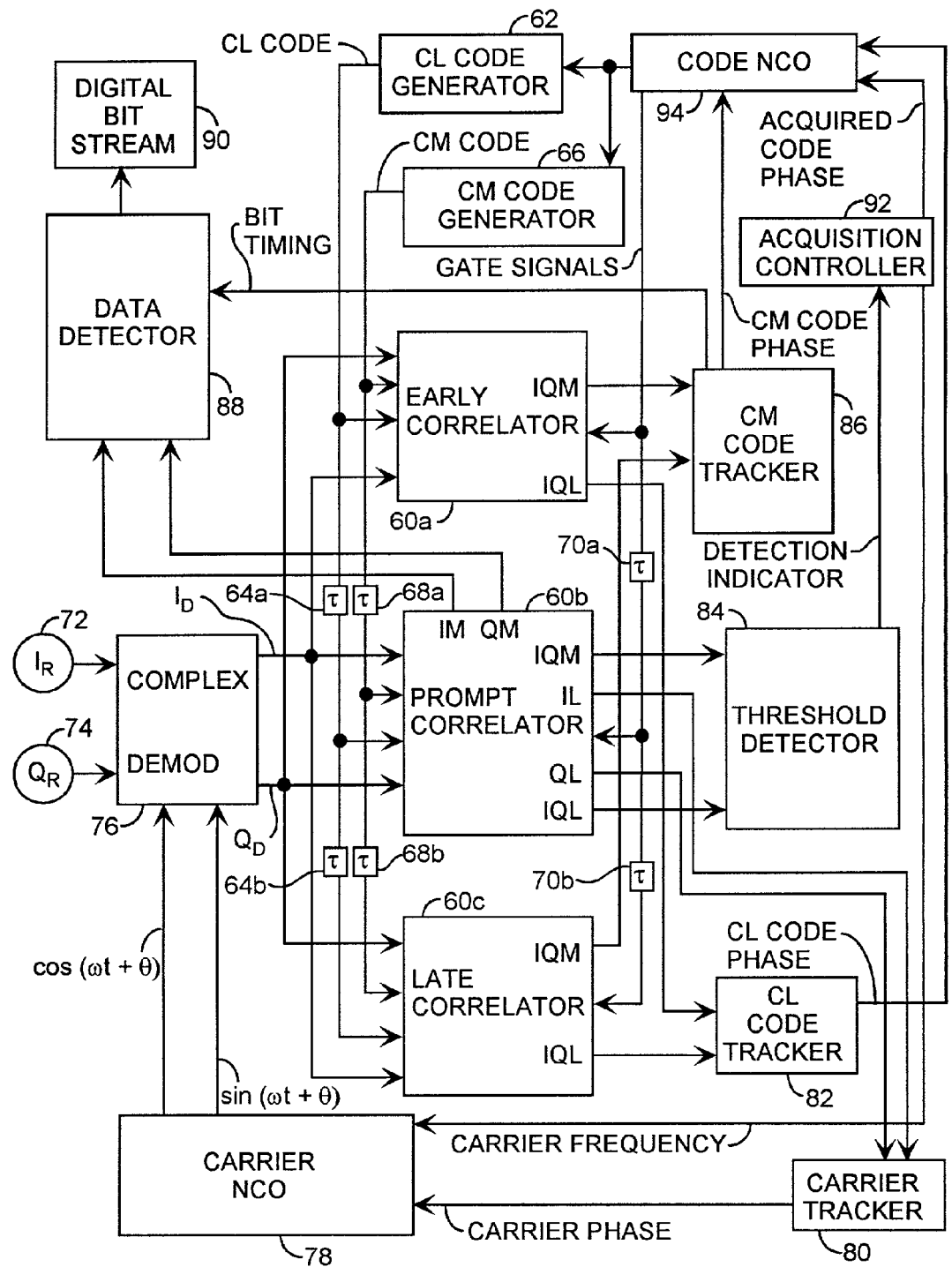
FIG. 2 is a block diagram of CM and CL correlator system.

Referring to FIGS. 1 and 2, and more particularly to FIG. 2, an exemplar CM and CL correlator tracking system is shown. The CM and CL code correlator can be applied to many different correlator systems including acquisition and tracking systems where the spreading code can be a composite TDM code of a plurality of constituent codes. The CM and CL correlator of FIG. 1 can be applied to many different types of spread spectrum receivers, such as GPS receivers, that use two-level TDM correlators for despreading spreading codes to enable code acquisition and tracking functions, such as code phase tracking, carrier phase tracking, and bit timing tracking. Carrier tracking, code acquisition and bit timing tracking are well known by those skilled in the art. The exemplar system of FIG. 2 has three identical gated TDM correlators, including an early correlator 60a, a prompt correlator 60b, and a late correlator 60c each receiving the $I_D$ and $Q_D$ signals 10 and 12 and providing the IM, QM, and IQM, and IL, QL, IQL correlations, 28, 32, and 30, and 44, 48, and 46, respectively. A CL code generator 62 provides the CL code 16 to the correlators 60a, 60b, and 60c. The CL code 16 is staggered in time by a first CL code delay 64a and by a second CL code delay 64b for providing an undelayed CL code to the early correlator 60a, a once delayed CL code to the prompt correlator 60b, and a twice delayed CL code to the late correlator 60c, where τ is the delay period. A CM code generator 66 provides the CM code 14 to the correlators 60a, 60b, and 60c. The CM code 14 is staggered in time by a first CM code delay 68a and by a second CM code delay 64b for providing an undelayed CM code to the early correlator 60a, a once delayed CM code to the prompt correlator 60b, and a twice delayed CM code to the late correlator 60c. The gate signals are communicated to the correlators 60a, 60b, and 60c. The gate signals are staggered in time by a first gating delay 70a and by a second gating delay 70b for providing undelayed gate signals to the early correlator 60a, once delayed gate signals to the prompt correlator 60b, and twice delayed gate signals to the late correlator 60c. The gate signals include the CM and CL gating and dumping signals 50, 51, 52, and 53. The delays 64a, 64b, 68a, 68b, 70a, and 70b are equal so that the correlators 60a, 60b, and 60c operate in staggered synchronism.

An $I_R$ received inphase signal 72 and a $Q_R$ received quadrature signal, that is spectrum spread by a spreading code is received by a complex demodulator 76 for respectively carrier demodulating the $I_R$ and $Q_R$ received signals 72 and 74 into the $I_D$ inphase and $I_Q$ quadrature demodulated signals 10 and 12. The complex demodulator 76 provides the $I_D$ signal 10 and $Q_D$ signals 12 where $I_D = I_R \cos(\omega t+\theta) - Q_R \sin(\omega t+\theta)$, and $Q_D = Q_R \cos(\omega t+\theta) - I_R \sin(\omega t+\theta)$. A carrier numerically controlled oscillator (NCO) 78 generates sin $(\omega t+\theta)$ and $\cos(\omega t+\theta)$ carrier replicas for complex demodulation by the demodulator 76. The carrier NCO 78 receives a carrier phase signal from a carrier tracker 80 and receives a carrier frequency signal. The carrier tracker 80 processes the QL and IL correlated outputs from the prompt correlator 60b over a period of time then outputs the phase correction signal $\theta$. The complex demodulator 76 generates the carrier frequency $\omega$ to downshift the $I_R$ and $Q_R$ received signals 72 and 74 with the carrier phase adjusted by $\theta$. The carrier NCO 78 generates the $\cos(\omega t+\theta)$ and $\sin(\omega t+\theta)$ carrier replicas from the input carrier frequency $\omega$ and carrier phase $\theta$. The carrier tracker 80 generates the carrier phase from the IL and QL correlations from the prompt correlator 60b. An acquisition controller 92 feeds carrier frequency to the carrier NCO 78.

A CL code tracker 82 generates a CL code phase from the IQL correlations from the early and late correlators 60a and 60c. The CL code tracker 82 processes the two IQL inputs from the early and late correlators 60a and 60c respectively over a period of time then outputs the CL code phase correction signal. A threshold detector 84 generates a threshold indicator from the IQM and IQL correlations from the prompt correlator 60b. When the IQM signal from the prompt correlator 60b is above a predetermined threshold, then threshold detector 84 sends the threshold indicator to the acquisition controller 92. A CM code tracker 86 generates CM code phase from the IQM correlations from the early and late correlators 60a and 60b. The CM code tracker 86 processes the IM and QM inputs from the early and late correlator 60a and 60c, respectively, over a period of time and then outputs the CM code phase correction signal.

The CM code tracker 86 also generates a bit timing signal. The CM code tracker 86 feeds the bit timing signal to a data detector 88 for generating a digital bit stream 90 that was modulated prior to transmission by the CL and CM TDM spreading codes. The data detector 88 examines the sign of the IM input to determine the data from the I channel input. The data detector 88 may also examine the sign of the QM input to determine the data from the Q input when modulated by data to provide the serial bit stream 90.

When the threshold indicator is received, the acquisition controller 92 generates an acquired code phase. The acquired code phase, the CM code phase, and the CL code phase are respectively communicated to a code NCO 94 that generates a chip clocking signal, communicated to the CL code generator 62 for generating the CL code, and communicated to the CM code generator 66 for generating the CM code. The CL and CM code generators 62 and 66 preferably have the same chipping rate. The CL code generator 62 generates the CL code synchronized to the input chip timing signal, as the CM code generator 66 generates the CM code also synchronized to the input chip timing signal. The code NCO 94 also generates the gate signals communicated through the first and second gating delays 70a and 70b. The code NCO 94 generates the chip timing signal from the code phase signal from acquisition controller 92 and the code phase correction signals from the CM code tracker 86 and the CL code tracker 82.

When the CM and CL correlator system starts from a cold start, without carrier lock, the acquisition controller 92 first turns off the carrier phase correction signal going to the carrier NCO 78 and turns off the acquired code signal going to the code NCO 94. The acquisition controller 92 then scans a range of carrier frequencies and code phases. In the scanning process, a carrier frequency and a code phase are respectively sent to the carrier NCO 78 and the code NCO 94. The acquisition controller 92 dwells on the carrier frequency and the code phase to determine acquisition when the threshold detector 84 provides the threshold indicator signal to the acquisition controller 92. When the threshold detector 84 indicates no detection, then the acquisition controller 92 will scan to the next carrier frequency and code phase. When the threshold detector 84 detects acquisition, the detector 84 sends the detection indicator signal to the acquisition controller 92 that then stops at the last carrier frequency and code phase and turns on the carrier phase correction signal to the carrier NCO 78 and the code phase correction signal to the code NCO 94, during locked tracking.

Due to FCC E911 mandate requiring that future cell phones include position determination devices, several hundred million commercial GPS receivers may be integrated into cell phones. The GPS receivers are also being used in personal data assistants, car navigators and other position aided devices. The CM code is beneficial to increasing the sensitivity of the GPS receivers. The CL code is beneficial to high accuracy GPS survey receivers. The gated TDM correlator can be used with the TDM L2CS signal or other spectrum spreading codes that are TDM. The composite spreading code TDM correlated in the receiver using a plurality of TDM constituent replica codes. In the preferred form, the composite spreading code is a CM and CL TDM spreading code and the replica codes are the CM and CL replica codes that are TDM correlated in the receivers. Those skilled in the art may select other spreading codes having at least different constituent codes that are TDM correlated in the receiver. In the preferred form, the correlator generates all four accumulated correlations IM 28, QM 32, IL 44, and QL 48, as well as magnitude correlations IQM 30 and IQL 46, but not all of these signals may be used in the TDM correlator systems. Those skilled in the art can make enhancements, improvements, and modifications to the invention, and these enhancements, improvements, and modifications may nonetheless fall within the spirit and scope of the following claims.

What is claimed is:

1. A correlator for use in a receiver providing gate signals for correlating first and second codes with a composite code that is time division multiplexed on a per chip basis at a chipping rate for spectrum spreading a transmitted signal having an inphase component and a quadrature component, the correlator comprising, first and second mixers for respective quadrature correlating the first code with the inphase component and with the quadrature component for respectively providing inphase and quadrature correlated first code signals, first and second integrators for respective accumulating integrations of the inphase and quadrature correlated first code signals during first integration periods repeated over a first dumping duration for respectively providing first and second accumulated integrations, the first integration periods are repeated at the chipping rate and controlled by the gate signals, third and fourth mixers for respective quadrature correlating the second code with the inphase component and with the quadrature component for respectively providing inphase and quadrature correlated second code signals, and third and fourth integrators for respective accumulating integrations of the inphase and quadrature correlated first code signals during second integration periods repeated over a second dumping duration for respectively providing third and fourth accumulated integrations, the second integration periods are repeated at the chipping rate defined by the gate signals, the first integration periods and the second integration periods are alternating equal periods.

2. The correlator of claim 1 further comprising, first and second dumpers and for respectively holding and dumping the first and second accumulated integrations over the first dumping period that is an inverse of a first dumping rate, the first dumping rate being defined by the gate signals, and third and fourth dumpers for respectively holding and dumping the third and fourth accumulated integrations over the second dumping period that is an inverse of a second dumping rate, the first dumping rate being defined by the gate signals.

3. A correlator for use in a receiver providing gate signals for correlating first and second codes with a composite code that is time division multiplexed on a chip-by-chip basis at a chipping rate for spectrum spreading a transmitted signal having an inphase component and a quadrature component, the correlator comprising, I1 and Q1 mixers for respective quadrature correlating the first code with the inphase component and with the quadrature component for respectively providing inphase and quadrature correlated first code signals, I1 and Q1 integrators for respective accumulating integrations of the inphase and quadrature correlated first code signals during first chip integration periods repeated over a first accumulated integration period for respectively providing I1 and Q1 accumulated integrations, the first chip integration periods are repeated at the chipping rate and controlled by the gate signals, I1 and Q1 dumpers and for respectively holding and dumping the I1 and Q1 accumulated integrations over the first accumulated integration period defined as an inverse of a first dumping rate, the first dumping rate being defined by the gate signals, I2 and Q2 mixers for respective quadrature correlating the second code with the inphase component and with the quadrature component for respectively providing inphase and quadrature correlated second code signals, I2 and Q2 integrators for respective accumulating integrations of the inphase and quadrature correlated first code signals during second chip integration periods repeated over a second accumulated integration period for respectively providing I2 and Q2 accumulated integrations, the second chip integration periods are repeated at the chipping rate defined by the gate signals, the first chip integration periods and the second chip integration periods are alternating equal periods, and I2 and Q2 dumpers for respectively holding and dumping the I2 and Q2 accumulated integrations over the second accumulated integration period defined as an inverse of a second dumping rate, the first dumping rate being defined by the gate signals.

4. The correlator of claim 3 wherein, the gate signals comprise a squarewave gating signal applied to the I1 and Q1 integrator and an inverted squarewave gating signal to the I2 and Q2 integrators.

5. The correlators of claim 3 wherein gate signals comprise, a two-level squarewave signal having a duty cycle having a first phase at one level and a second phase at a second level with the first phase and second phase having equal duration for respectively controlling the I1 and Q1 integrators during the first phase and controlling the I2 and Q2 integrators during the second phase.

6. The correlators of claim 3 wherein the gate signals comprise, a first dumping signal for controlling the first dumping rate of the I1 and Q1 accumulated correlations respectively by the I1 and Q1 dumpers, and a second dumping signal for controlling the second dumping rate of the I2 and Q2 accumulated correlations respectively by the I2 and Q2 dumpers.

7. The correlator of claim 3 wherein, the composite code is a time division multiplex composite of the first and second codes.

8. The correlator of claim 3 wherein, the first dumping period is a first plurality of chip periods of the chipping rate, and the second dumping period is a second plurality of chip periods of the chipping rate.

9. The correlator of claim 3 wherein, the first chip integration periods are repeated up to 10230 times during the first dumping period of up to 20 milliseconds, and the second chip integration periods are repeated up to 767250 times during the second dumping period of up to 1500 milliseconds, and the chipping rate is 1.023 million chips per second.

10. The correlator of claim 3 wherein, the first and second codes are interleaved together to form the composite code.

11. The correlator of claim 3 wherein, the first and second codes are interleaved together by alternating code chips to form the composite code.

12. The correlator of claim 3 wherein, the composite code is a spreading code that is a chip-by-chip time division multiplex composite of the first and second codes, the first and second codes being time division multiplexed by alternating chips where the first and second chip integration periods each equal a chip period of the chipping rate.

13. The correlator of claim 3 wherein, the second code is longer than the first code.

14. The correlator of claim 3 wherein, the second code is a civilian moderate CM code, the second code is a civilian long CL code, and the composite code is a second L-band frequency civilian signal L2CS code, the CM code and CL code being constituent codes interleaved every other chip to form the composite code.

15. The correlator of claim 3 wherein, the receiver comprises a tracker for generating the gate signals, the tracker tracking code phase of the first and second codes relative to the composite code of the transmitted signal.

16. A correlator for use in a receiver for correlating a civilian moderate CM code and civilian long CL code with a second L-band civilian signal L2CS spreading code spectrum spreading a transmitted signal having an inphase component and a quadrature component, the composite spreading code is a time division multiplexed version of the CM replica code and the CL replica code interleaved every chip, the receiver generating a gating signal, a CM dumping signal and CL dumping signals for synchronized tracking of the L2CS spreading code, the correlator comprising, IM and QM mixers for respective quadrature correlating the CM code with the inphase component and with the quadrature component for respectively providing inphase and quadrature correlated CM code signals, IM and QM integrators for respective accumulating integrations of the inphase and quadrature correlated CM code signals during CM integration periods repeated over a CM dumping duration for respectively providing IM and QM accumulated integrations, the CM integration periods are repeated at the chipping rate and controlled by the gating signal, IM and QM dumpers for respectively holding and dumping the IM and CM accumulated integrations over the CM dumping period defining a CM dumping rate, the CM dumping rate being defined by the CM dumping signal, IL and QL mixers for respective quadrature correlating the CL code with the inphase component and with the quadrature component for respectively providing inphase and quadrature correlated CL code signals, IL and QL integrators for respective accumulating integrations of the inphase and quadrature correlated CL code signals during CL integration periods repeated over a CL dumping duration for respectively providing IL and QL accumulated integrations, the CL integration periods are repeated at the chipping rate and controlled by the gating signal, and IL and QL dumpers for respectively holding and dumping the IL and QL accumulated integrations over the CL dumping period defining a CL dumping rate, the CL dumping rate being defined by the CL dumping signal.

17. The correlator of claim 16 wherein,

The gating signal is a squarewave gating signal to the IM, QM, IL, and QL integrators and dumpers, the squarewave having an M phase period and an L phase period that are equal.

18. The correlator of claim 16 wherein, the IM and QM integrators are not powered when the IL and QL integrators are integrating over the CL integration periods, and the IL and QL integrators are not powered when the IM and QM integrators are integrating over the CM integration periods.

19. The correlator of claim 16 wherein, the CM and CL codes are time division multiplexed by alternating chip-by-chip multiplexing.

20. The correlator of claim 16 wherein the chipping rate is 1.023 megacycles per second.

* * * * *